US006044669A

United States Patent [19]

Levi

[11] Patent Number: 6,044,669

[45] Date of Patent: Apr. 4, 2000

[54] STRAP LOCK

[76] Inventor: Clark Levi, 3333 Pine Cir., Ocean Springs, Miss. 39564

[21] Appl. No.: 09/074,518

[22] Filed: May 8, 1998

[51] Int. Cl.[7] .................... E05B 73/00

[52] U.S. Cl. .................... 70/18; 70/49; 70/58; 292/307 R

[58] Field of Search .................... 70/14, 18, 30, 70/49, 58; 292/307 R

[56] References Cited

U.S. PATENT DOCUMENTS

| | | | |
|---|---|---|---|
| 598,656 | 2/1898 | De Colton | 70/49 |
| 1,230,799 | 6/1917 | Scholly | 70/18 |
| 1,348,960 | 8/1920 | Saegesser | 70/18 |
| 3,435,642 | 4/1969 | Del Pesco | 70/49 |
| 3,765,196 | 10/1973 | Balicki | 70/18 X |
| 3,808,847 | 5/1974 | Vesely | 70/18 |
| 3,959,995 | 6/1976 | Fletcher | 70/58 X |
| 4,019,354 | 4/1977 | O'Dell | 70/18 X |
| 4,494,391 | 1/1985 | Solow | 70/18 X |
| 4,768,358 | 9/1988 | Viola et al. | 70/14 |
| 4,803,857 | 2/1989 | Hall et al. | 70/14 X |
| 5,076,531 | 12/1991 | Delaney | 70/58 X |
| 5,177,986 | 1/1993 | Jensen | 70/18 |
| 5,475,993 | 12/1995 | Kuo | 70/18 |

FOREIGN PATENT DOCUMENTS

| | | | |
|---|---|---|---|
| 82785 | 2/1921 | Austria | 70/49 |
| 1005254 | 4/1952 | France | 70/49 |
| 350146 | 3/1922 | Germany | 70/49 |
| 381406 | 9/1923 | Germany | 70/49 |
| 425529 | 8/1924 | Germany | 70/49 |
| 178899 | 4/1922 | United Kingdom | 70/49 |

*Primary Examiner*—Lloyd A. Gall
*Attorney, Agent, or Firm*—Wenderoth, Lind & Ponack, L.L.P.

[57] ABSTRACT

A variably-sized strap lock includes a strap and a lock body. The strap consists of a free end portion, a hinge portion and a lock portion. A variably-sized loop is formed by inserting the strap into the lock body and pulling the strap through the lock body to remove excess slack. The lock body engages either a series of teeth or a pair of chain-like members located on the strap and prevents withdrawal without disengagement by the user. A pair of hinges or the pair of chain-like members of the strap allow the hinge portion of the strap to lie flush against the lock body portion of the strap thus allowing the strap lock to be tightly secured onto an object to prevent rattling or inadvertent disengagement.

9 Claims, 5 Drawing Sheets

100

STRAP LOCK

FIELD OF THE INVENTION

The present invention relates to the field of securing devices. In particular, the present invention relates to flexible and variably sized strap-type securing devices, or strap locks, which may be utilized without excess slack and may be tightly secured to an object so that it will not rattle or disengage from the object. The device is especially convenient as a locking device used to secure sporting equipment such as bicycles or kayaks.

BACKGROUND OF THE INVENTION

The use of sporting equipment securing devices is well known in the prior art. Sporting equipment securing devices typically consist of a cable type device with loops located at both ends used in conjunction with a padlock, a U-shaped lock, or an elastic band used to secure equipment during transport. While these devices satisfy the basic objective and requirement of securing one object to another, these devices also possess several drawbacks.

A typical cable type securing device consists of a fixed length cable with a loop located at each end. A padlock is typically passed through each loop and locked to secure the ends. In use, the cable is wrapped around, both, a portion of the sporting equipment, for example a bicycle frame, as well as a locking structure, such as a bicycle rack. The cable is wrapped repeatedly around the bicycle frame and rack until the slack in the cable is minimized. As the loops are separated by a cable having a fixed length, an exactly sized cableloop, between the frame and the rack, is difficult to attain. Oftentimes, it is impossible to eliminate all of the excess slack. This can prove troublesome in situations where a user has secured a bicycle to a rack mounted on an automobile. The excess slack could allow the bicycle to become dislodged from the rack and damaged during transport.

A U-shaped lock has also been used for the purpose of locking sporting equipment. Typically, these devices consist of a heavy U-shaped piece which may be lockingly connected to a straight piece. In use, the bicycle frame is placed adjacent a bicycle rack, or perhaps a signpost. Next, the frame and the rack or signpost are bounded on three sides by the U-shaped piece and on the final side by the straight piece. The two pieces are then locked together. To store the U-shaped lock onto the bicycle, the lock is typically inserted into a separate storing rack attached to the bicycle frame or simply hung over a handlebar. As the lock is not securely attached to the frame, the lock may rattle or fall off as the bicycle is used. In addition, as the U-shaped lock possesses a relatively small fixed geometric configuration, it cannot serve the purpose of securing sporting equipment to a rack mounted on an automobile. Thus, although the U-shaped lock serves as an anti-theft device, a separate device is required to secure a piece of equipment for transport.

The problem of securing a piece of sporting equipment, without excess slack, to a transport rack has been solved to some extent through the use of elastic bands having engaging hooks located at each end. In use, the elastic band is wrapped around the bicycle frame and the rack and then secured by joining the hooks. The elastic nature of the band allows the user to stretch the band while wrapping around the frame and rack thus eliminating any excess slack. However, these elastic bands are generally easily disengaged and thus fail to serve as an anti-theft device.

Hence, it is apparent that a continuing need exists for a variably sized sporting equipment securing device which is lightweight and which may be exactly sized not only to remove excess slack but also to securely store the device onto the sporting equipment.

SUMMARY OF THE INVENTION

An object of the present invention is to provide a new and improved strap lock.

It is another object of the present invention to provide a strap lock which may be variably sized and easily engaged.

It is yet another object of the present invention to provide a strap lock which not only locks objects to stationary objects but also tightly secures objects to moving objects for transport.

It is a further object of the present invention to provide a strap lock which may be tightly secured to an object so that it will not rattle or disengage from the object.

An even further object of the present invention is to provide a strap lock which is sufficiently durable to serve as an anti-theft device.

Accordingly, the present invention provides a strap lock which may be used, for example, to secure sporting equipment to storage or locking racks. The invention is variably sized and thus may be used to secure a piece of equipment to a rack without excess slack and may be stored onto a frame so that the device will not rattle. In addition, as the invention is strong and has locking capabilities, it may be used as an anti-theft device.

To attain these and other objectives, a first embodiment of the present invention has a strap having a free end portion, a hinge portion, and a lock portion. The three portions are joined together through a pair of hinges, which allow the hinge portion to lie flush against the lock portion. The strap also has a series of teeth formed on an inner surface of the free end portion. A lock body is attached to the lock portion and has a strap receiving aperture. In addition, the lock body is designed to receive and engage the teeth of the strap in a manner which allows insertion of the strap but also prevents withdrawal. The lock body is able to engage the strap at any point in the series of teeth, thus facilitating a variably sized loop. In use, the strap is passed through the strap receiving aperture where the lock engages the teeth, until a desired loop size is reached. A locking mechanism is provided on the lock body and may be used to disengage the lock body from the teeth, thus allowing withdrawal of the strap from the lock. In addition, the first embodiment of the present invention may optionally have a reinforcing material disposed within the strap or two raised outer edge reinforcing portions extending from the strap inner surface.

A second embodiment of the present invention is also made up of a strap having a free end portion, a hinge portion, and a lock portion. The entire length of the strap is bounded, on both edges, by two chain-like securing members. In addition, the free end portion has a durable material located between the two chain-like securing members. The durable material extends throughout the length of the free end portion but is absent from the hinge portion. Hence, the hinge portion consists of only the chain-like securing members, which allow the entire hinge portion to lie flush against the lock portion. A lock body is attached to the lock portion and has a strap receiving aperture. In use, the strap is passed through the strap receiving aperture, where the lock may be engaged with the securing members, until a desired loop size is reached. Similar to the first embodiment, a locking mechanism may be used to disengage the lock from the securing members to allow withdrawal of the strap from the lock.

BRIEF DESCRIPTION OF THE DRAWINGS

Other objects and advantages of this invention will become apparent from the following description taken in conjunction with the accompanying drawings which set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENTS

Figure 3:
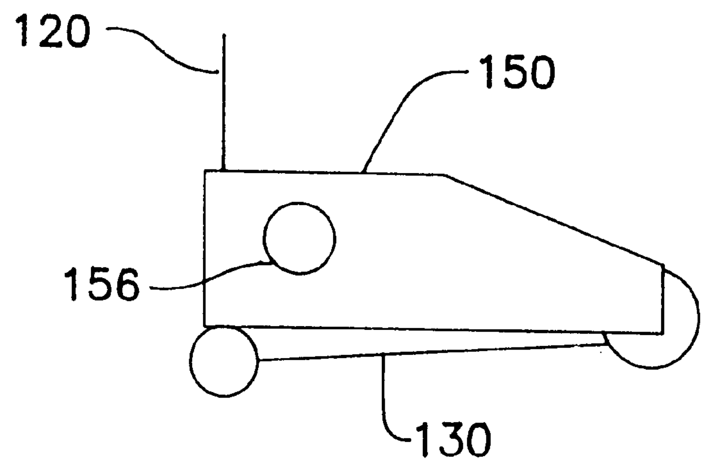
FIG. 3 is a partial side view of the lock of FIG. 1 with the strap completely inserted into the lock body.

Referring to FIGS. 1 through 5, a strap lock 100, according to a first embodiment of the present invention, has a strap 110 attached to a lock body 150. Strap 110 includes a free end portion 120, a hinge portion 130, and a lock portion 140. The lock portion 140 of strap 10 has a lock end 141 and a hinged end 142. Similarly, the hinge portion 130 has a first hinged end 131, which is joined to the lock portion hinged end 142, and a second hinged end 132. Finally, the free end portion has a free end 121 and a hinged end 122, which is joined to the second hinged end 132 of the hinge portion. The hinged ends 142, 131, 132, and 122 allow the strap portions 120, 130, and 140 to pivot with respect to one another. In addition, the length of lock portion 140 is equal to, or is substantially equal to, the length of hinge portion 130, which allows hinge portion 130 to lie flush against lock portion 140, as seen in FIG. 3, when the strap 110 is completely inserted into the lock body 150.

The hinged ends 142, 131, 132, and 122 may take the form of any hinge device known in the prior art and may be either integrally formed with the respective strap portions 140, 130, and 120 or formed separately and later attached. As an example, the hinged ends 142, 131, 132, and 122 shown in FIG. 1 may have cylindrical units engaged together by a pin. Alternatively, the strap portions 140, 130, and 120 may be integrally formed as one piece having a pair of reduced thickness sections forming hinges which allow pivoting of the strap portions 140, 130, and 120.

Figure 4:
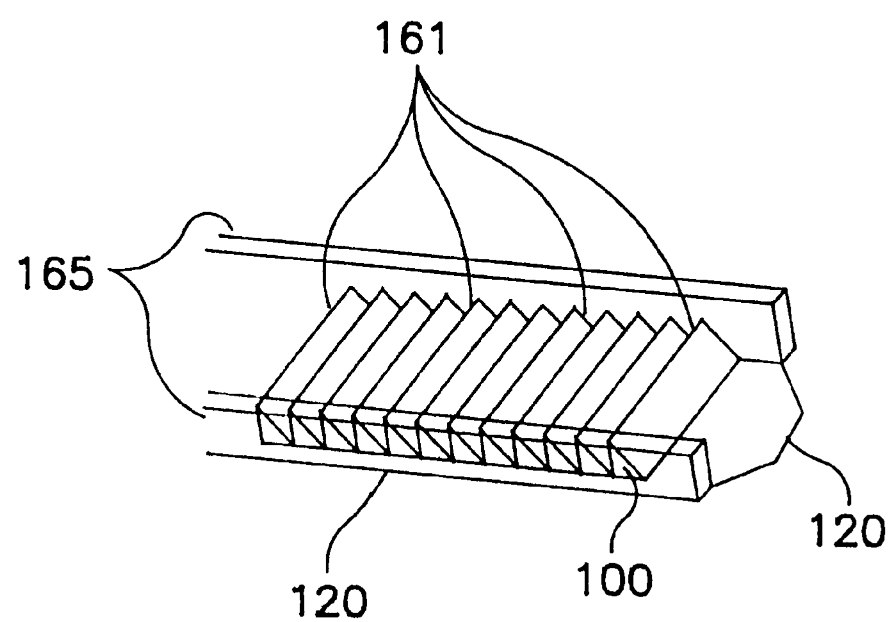
FIG. 4 is a partial perspective view of a strap of FIG. 1 with raised reinforcing edges.
Figure 5:
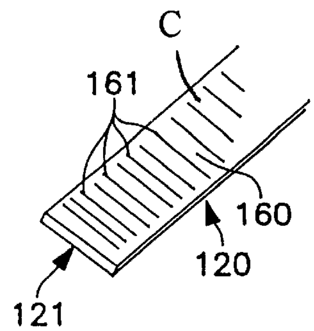
FIG. 5 is a partial perspective view of a strap of FIG. 1 without raised reinforcing edges.
Figure 6:
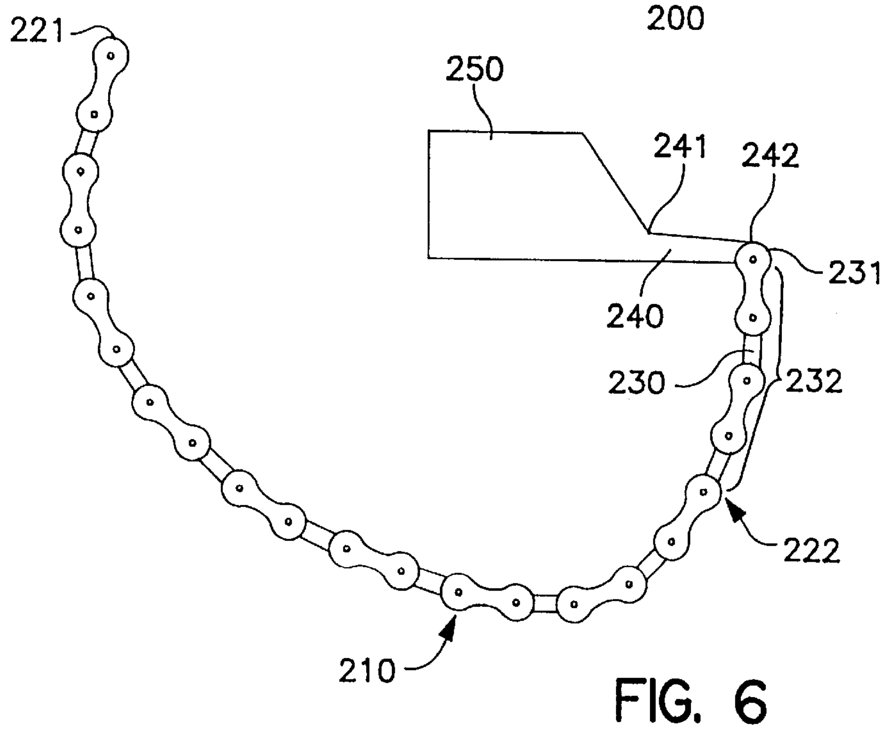
FIG. 6 is a side view of a second embodiment of the present invention.

As best seen in FIGS. 4 and 5, the free end portion 120 of strap 110 has a series of teeth 161 integrally formed onto an inner surface 160 of the free end portion. The series of teeth 161 are formed to slope toward the inner surface and the free end 121 and run the entire length of the free end portion 120. In addition, strap 110 may, optionally, have two raised outer edge reinforcing portions 165, as seen in FIG. 4, which extend generally perpendicularly from the inner surface 160 and run the entire length of the strap 110. Furthermore, cables C (not shown) may also be, optionally, disposed longitudinally within the strap portions to serve as an additional reinforcement.

The lock body 150 may be attached to either a top surface or an end tip of the lock portion lock end 141 and may be any locking device known in the prior art. As an example, the lock body shown in FIG. 1 has a strap receiving aperture 151 extending perpendicular to the lock portion 140, through the lock body 150, and consists of a ratchet mechanism 155, and a lock 156 which engages the ratchet mechanism 155. The ratchet mechanism allows the strap 110 to be inserted and pulled through the strap receiving aperture 151 but engages the series of teeth 161 to prevent the strap 110 from being withdrawn from the lock body 150. As the ratchet mechanism 155 can engage any particular tooth, any desired loop size may be easily attained. The strap is simply pulled through the strap receiving aperture 151 until a desired loop size is reached. The strap 110 can be released from the lock body 150 by using the lock to disengage the ratchet mechanism 155 from the series of teeth 161. Once the ratchet mechanism 155 is disengaged, the strap 110 may be freely pulled from the lock body 150. Although the lock body 150 of FIG. 1 indicates that a key lock is used to disengage the ratchet mechanism 155, any suitable locking and disengagement device may be used. Alternatively, for example, it is conceivable that some sort of combination lock may be used in place of the key lock.

Figure 11:
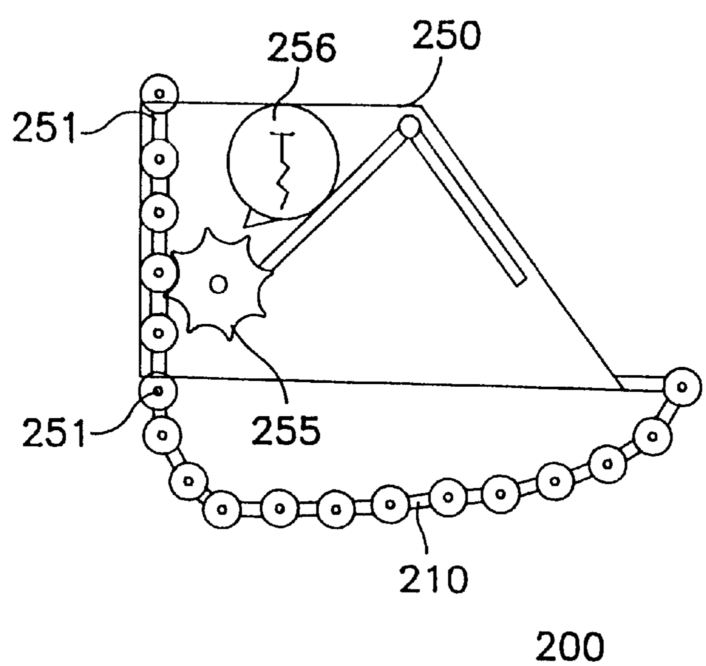
FIG. 11 is a partial side view of the lock of FIG. 6 with the strap completely inserted into the lock body.

FIGS. 6 through 11 show a second embodiment of the present invention. Similar to the first preferred embodiment, the strap lock 200 of the second preferred embodiment consists of a strap 210 attached to a lock body 250. Strap 210 consists of a free end portion 220, a hinge portion 230, and a lock portion 240. The lock portion 240 of strap 210 has a lock end 241 and a hinged end 242. Similarly, the hinge portion 230 has a first hinged end 231, which is joined to the lock portion hinged end 242, and a second hinged end 232. Finally, the free end portion 220 has a free end 221 and a hinged end 222, which is joined to the second hinged end 232 of the hinge portion. The length of lock portion 240 is equal to, or is substantially equal to, the length of hinge portion 230 which facilitates allowing hinge portion 230 to lie flush against lock portion 240, as seen in FIG. 11, when the strap 210 is completely inserted into the lock body 250.

Figure 1:
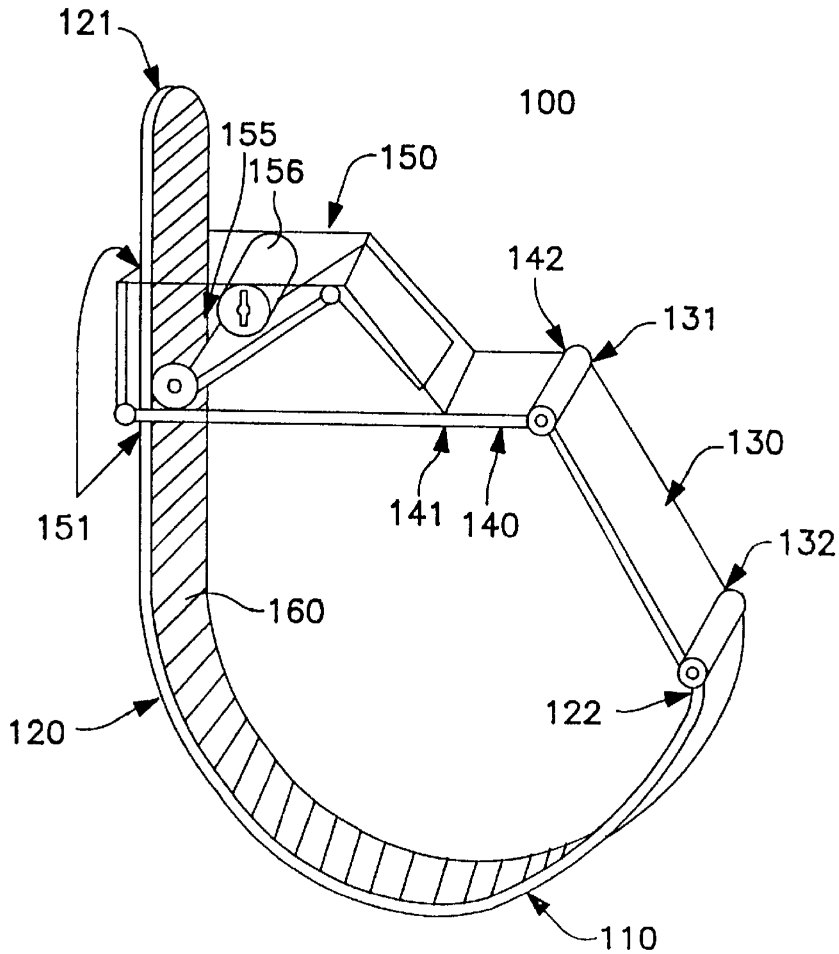
FIG. 1 is a perspective view of a first embodiment of the present invention.
Figure 9:
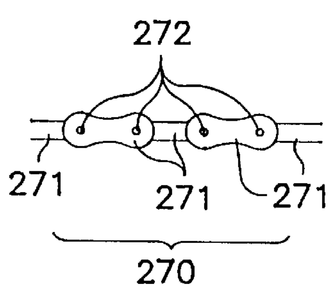
FIG. 9 is a partial side view of the securing member of FIG. 6.
Figure 2:
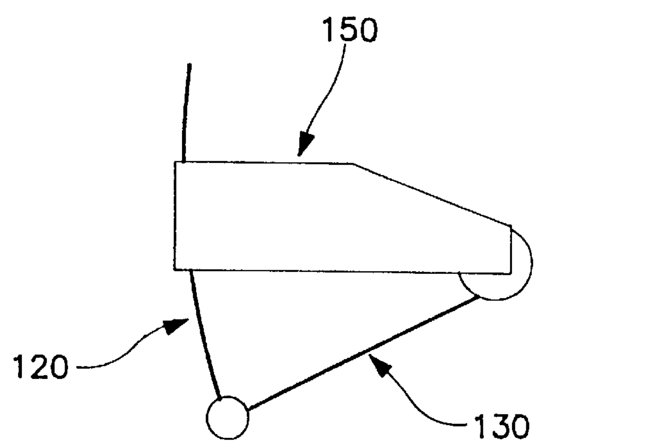
FIG. 2 is a partial side view of the lock of FIG. 1 with the strap partially inserted into the lock body.
Figure 7:
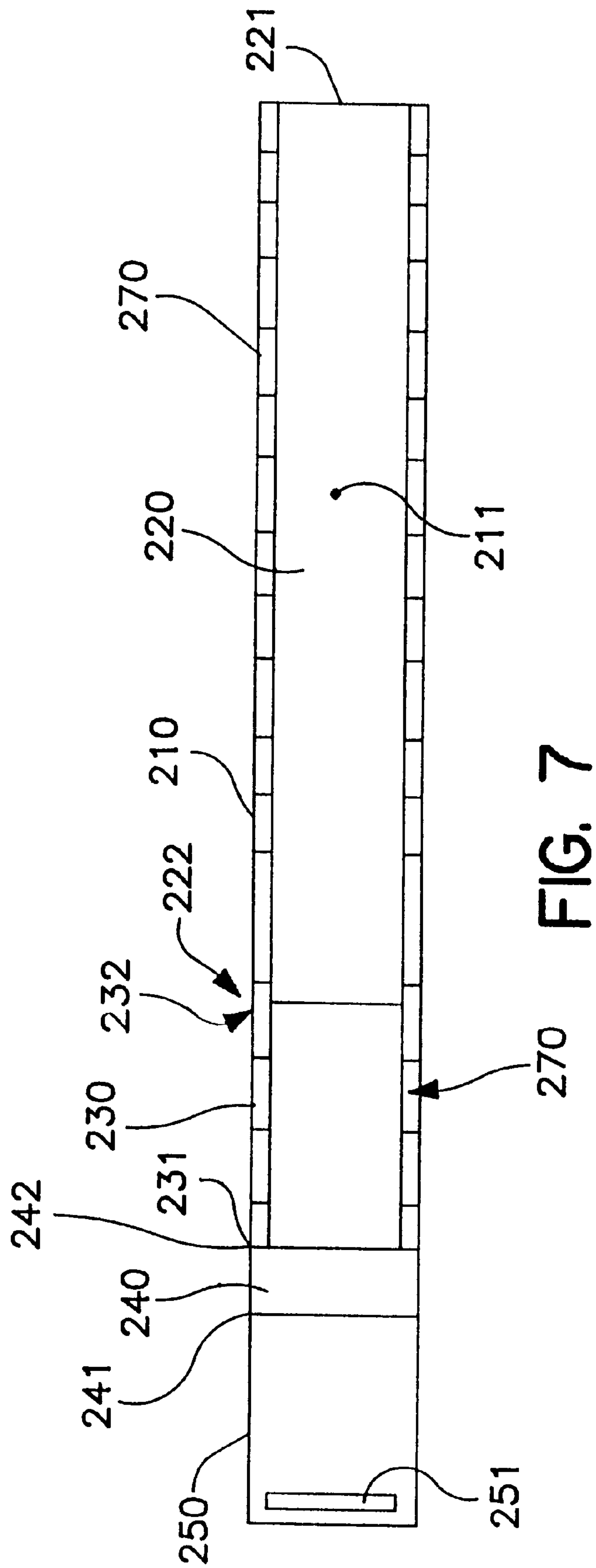
FIG. 7 is a top view of the strap of FIG. 6.
Figure 10:
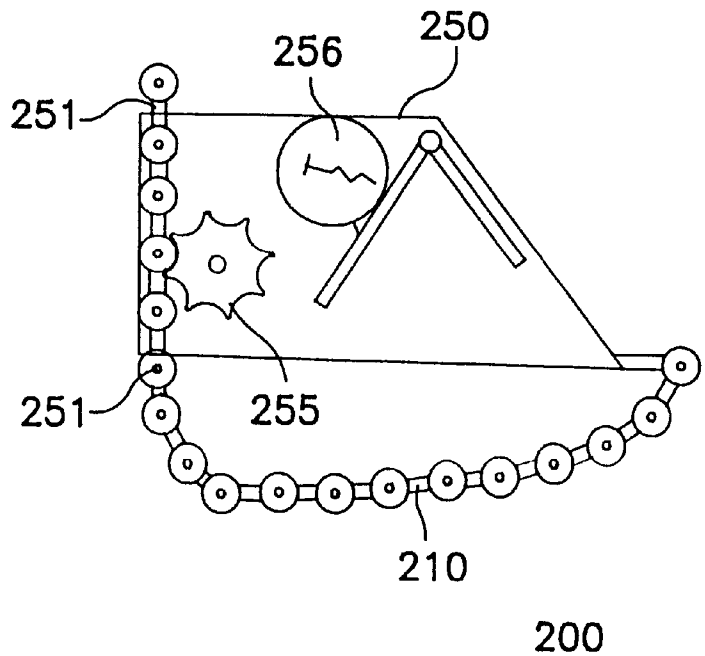
FIG. 10 is a partial side view of the lock of FIG. 6 with the strap partially inserted into the lock body.

Referring to FIG. 7, strap 210, in addition to having strap portions 240, 230, and 220, consists of two securing members 270. Securing members 270 are located laterally on each side of strap 210 and extend from the free end 221 of the free end portion 220 to the first hinged end 231 of the hinged portion 230. The securing members 270, as best seen in FIGS. 8 and 9 consist of a series of links 271 joined together by pins 272 and are similar to a bicycle chain.

Figure 8:
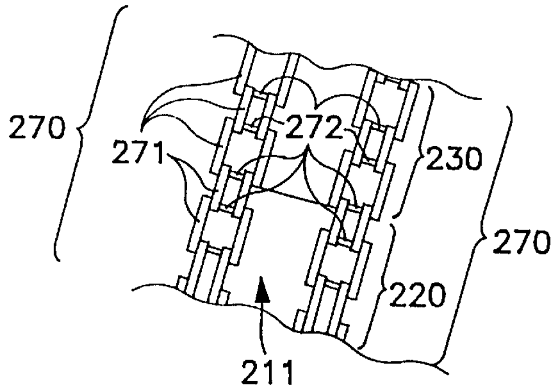
FIG. 8 is a partial top view of a securing member of FIG. 6.

As best seen in FIG. 8, the free end portion 220 is made up of a strap body 211 located between the securing members 270. The securing members may be either integrally formed with the strap body 211 or formed separately and later attached. In contrast, the hinge portion 230 of strap 210, consists solely of the two securing members 270. As the securing members are exceptionally flexible and as the hinge portion 230 lacks the presence of any rigid material, the hinge portion 230 is able to lie flush against the lock body portion 240 when the strap 210 is completely inserted into the lock body, as best seen in FIG. 11.

Similar to the first preferred embodiment, the lock body 250 may be attached to either a top surface or an end tip of the lock portion lock end 241 and may be any locking device known in the prior art. As an example, the lock body shown in FIGS. 10 and 11, has a strap receiving aperture 251 extending perpendicular to the lock portion 240, through the lock body 250, and consists of a sprocket mechanism 255, and a lock 256 which engages the sprocket mechanism 255. The sprocket mechanism 255 allows the strap 210 to be inserted and pulled through the strap receiving aperture 251 but engages the links 271 of the securing members 270 to prevent the strap 210 from being withdrawn from the lock body 250. As the sprocket mechanism 255 can engage any particular link 271, any desired loop size may be easily attained. The strap is simply pulled through the strap receiving aperture 251 until a desired loop size is reached. The strap 210 can be released from the lock body 250 by using the lock 256 to disengage the sprocket mechanism 255 from the links 271 of the securing members 270. Once the sprocket mechanism 255 is disengaged, the strap 210 may be freely pulled from the lock body 250. Although the lock body 250 of FIGS. 10 and 11 indicates that a key lock is used to disengage the sprocket mechanism 255, any suitable locking and disengagement device may be used. Alternatively, for example, it is conceivable that some sort of combination lock may be used in place of the key lock.

As the strap lock of the present invention is intended to be used as a securing device suitable not only for transport purposes but also as an anti-theft device, the materials used to construct the particular elements must necessarily be durable. For example, the strap 110 and the strap body 211 are preferably formed of a durable plastic material, such as molded KEVLAR. In addition, the lock bodies 150, 250 and securing members 270 may be formed of a metal material, such as stainless steel, or of a durable plastic. Of course, other materials might also be used alone, or in combination with each other as needed to meet the strength requirements of the strap lock.

In operation, according to the preferred embodiments of the present invention, the strap lock may be used to secure an object, for example a bicycle, to a securing structure, for example a transport rack mounted onto an automobile. The bicycle is first loaded onto the transport rack. Next, the strap 110, 210 is used to encircle a portion of the bicycle frame and a portion of the transport rack frame. Then, the strap 110, 210 is inserted into and passed through the strap receiving aperture 151, 251 of the lock body 150, 250. As the lock body 150, 250 engages the series of teeth 161 formed on the strap inner surface 160, or alternatively the links of the securing members 270, the lock body 150, 250 prevents any inadvertent withdrawal of the strap 110, 210. Finally, the strap 110, 210 is pulled tight to remove any excess slack, thus allowing safe transport of the bicycle.

After transport, to remove the bicycle from the rack, the lock is used to disengage the lock body 150, 250 from the series of teeth 161, or alternatively the links 271 of the securing members 270. Once the teeth or links 271 are disengaged, the strap 110, 210 may be freely removed from the lock body 150, 250, thus allowing the bicycle to be removed from the rack.

To store the strap lock of the present invention so that it will not rattle or inadvertently disengage from the bicycle, the strap 110, 210 is simply wrapped around the frame or seat post of the bicycle and inserted into and passed through the strap receiving aperture. The strap is then pulled tight to remove any excess slack. Hinged ends 142, 131, 132, and 122, or alternatively hinge portion 230, allow the strap lock 110, 200 to form an exceptionally small loop, thus allowing the strap lock 100, 200 to be tightly secured to even the smallest frame diameters. The tight securement of the strap lock 100, 200 to the bicycle frame prevents rattling and eliminates any fear of inadvertent disengagement during use of the bicycle.

What is claimed is:

1. A strap lock comprising:

a strap having a free end portion, a hinge portion, and a lock portion;

a lock body, attached to said lock portion, having a strap receiving aperture;

wherein when said strap is passed through said strap receiving aperture, said lock body engages said strap to lock said strap within said lock body;

wherein said lock portion has a lock end and a hinged end;

wherein said hinge portion has a first hinged end, movably attached to said hinged end of said lock portion, and a second hinged end;

wherein said free end portion has a free end and a hinged end movably attached to said second hinged end of said hinge portion;

wherein said strap further comprises at least one securing member extending from said free end of said free end portion to at least said first hinted end of said hinge portion;

wherein when said strap is passed through said strap receiving aperture, said lock body engages said at least one securing member to lock said strap within said lock body; and wherein said free end portion is made of a polymer and extends from said free end of said free end portion to said hinged end of said free end portion.

2. A strap lock comprising:

a strap having a free end portion, a hinge portion, and a lock portion;

a lock body, attached to said lock portion, having a strap receiving aperture;

wherein when said strap is passed through said strap receiving aperture, said lock body engages said strap to lock said strap within said lock body;

wherein said lock portion has a lock end and a hinged end;

wherein said hinge portion has a first hinged end, movably attached to said hinged end of said lock portion, and a second hinged end;

wherein said free end portion has a free end and a hinged end movably attached to said second hinged end of said hinge portion;

wherein said strap further comprises two securing members extending from said free end of said free end portion to at least said first hinged end of said hinge portion;

wherein when said strap is passed through said strap receiving aperture, said lock body engages said securing members to lock said strap within said lock body;

wherein said strap has two lateral edges;

wherein each of said two securing members is located at said lateral edges; and wherein said free end portion comprises a strap body made of a plastic material, interposed between said two securing members, and extends from said free end of said free end portion to said hinged end of said free end portion.

3. A strap lock comprising:

an elongate flexible strap comprising a plastic material, said flexible strap having a free end and a hinged end;

a hinge plate having a first end hinged to said hinged end of said flexible strap and a second end; and a lock portion having a hinged end hinged to said second end of said hinge plate, a strap receiving aperture extending through said lock portion for receiving said flexible strap therein so that said flexible strap can be inserted into said strap receiving aperture and through said lock portion so as to be adjustably positioned in said strap receiving aperture, and a lock positioned on said lock portion adjacent to said strap receiving aperture for locking said flexible strap in place upon insertion of said flexible strap into said strap aperture.

4. The strap lock of claim 3, wherein said hinge plate has a length between said first and second ends approximately the same as a length of said lock portion between said hinged end of said lock portion and said strap receiving aperture.

5. The strap lock of claim 3, wherein a reinforcing material is disposed within said flexible strap.

6. A strap lock comprising:

an elongate flexible strap comprising a plastic material, said flexible strap having a free end and a hinged end;

a hinge portion having a first end hinged to said hinged end of said flexible strap and a second end;

a lock portion having a hinged end hinged to said second end of said hinge portion, a strap receiving aperture extending through said lock portion for receiving said flexible strap therein so that said flexible strap can be inserted into said strap receiving aperture and through said lock portion so as to be adjustably positioned in said strap receiving aperture, and a lock positioned on said lock portion adjacent to said strap receiving aperture for locking said flexible strap in place upon insertion of said flexible strap into said strap receiving aperture.

7. The strap lock of claim 6, wherein said plastic material comprises Kevlar.

8. The strap lock of claim 6, wherein said hinge position has a length between said first and second ends approximately the same as a length of said lock portion between said hinged end of said lock portion and said strap receiving aperture.

9. The strap lock of claim 6, wherein a reinforcing material is disposed within said flexible strap.

* * * * *